(12) United States Patent
Subtelny

(10) Patent No.: US 8,668,052 B2
(45) Date of Patent: Mar. 11, 2014

(54) CONSTANT LEVEL OILER LEVEL ADJUSTMENT TOOL

(75) Inventor: Peter William Subtelny, League City, TX (US)

(73) Assignee: Phillips 66 Company, Houston, TX (US)

( * ) Notice: Subject to any disclaimer, the term of this patent is extended or adjusted under 35 U.S.C. 154(b) by 26 days.

(21) Appl. No.: 13/343,259

(22) Filed: Jan. 4, 2012

(65) Prior Publication Data

US 2012/0175191 A1   Jul. 12, 2012

Related U.S. Application Data

(60) Provisional application No. 61/430,743, filed on Jan. 7, 2011.

(51) Int. Cl.
*F01M 11/06* (2006.01)

(52) U.S. Cl.
USPC .......................................... 184/103.1; 184/7.4

(58) Field of Classification Search
USPC ............................................... 184/103.1, 7.4
See application file for complete search history.

(56) References Cited

U.S. PATENT DOCUMENTS

| | | | | |
|---|---|---|---|---|
| 2,979,161 | A * | 4/1961 | Lyden | 184/103.1 |
| 3,590,857 | A * | 7/1971 | Gruett | 137/414 |
| 3,605,086 | A * | 9/1971 | Triska | 340/450.3 |
| 4,342,376 | A | 8/1982 | Lyden | |
| 4,409,867 | A | 10/1983 | Lyden | |
| 4,895,222 | A * | 1/1990 | Hoffmann | 184/103.1 |
| 5,878,842 | A * | 3/1999 | Rake | 184/6.4 |
| 7,140,468 | B2 * | 11/2006 | Rake et al. | 184/6.23 |
| 7,845,813 | B1 * | 12/2010 | Beck | 362/101 |
| 8,424,648 | B2 * | 4/2013 | Wilson et al. | 184/7.4 |
| 2011/0147127 | A1 * | 6/2011 | Wilson et al. | 184/7.4 |

* cited by examiner

*Primary Examiner* — William A Rivera
*Assistant Examiner* — Michael Riegelman
(74) *Attorney, Agent, or Firm* — Phillips 66 Company

(57) ABSTRACT

Methods and apparatus relates to a tool with a laser to assist with adjustment of a constant level oiler associated with rotating equipment. The tool projects light from the laser onto a housing of the rotating equipment to identify position of a level adjuster of the oiler relative to an oil level marker on the housing of the rotating equipment. The tool includes a portion that is inserted into part of the oiler during use of the tool and is coupled to the laser, which may be moveable from the portion inserted and may have extension from the portion inserted counterbalanced by a weight also coupled to the portion inserted.

19 Claims, 2 Drawing Sheets

CONSTANT LEVEL OILER LEVEL ADJUSTMENT TOOL

CROSS-REFERENCE TO RELATED APPLICATIONS

This application is a non-provisional application which claims benefit under 35 USC §119(e) to U.S. Provisional Application Ser. No. 61/430,743 filed Jan. 7, 2011, entitled "CONSTANT LEVEL OILER LEVEL ADJUSTMENT TOOL" which is incorporated herein in its entirety.

STATEMENT REGARDING FEDERALLY SPONSORED RESEARCH OR DEVELOPMENT

None.

FIELD OF THE INVENTION

Embodiments of the invention relate to a tool with a laser for use in adjusting an oiler coupled in fluid communication with rotating equipment.

BACKGROUND OF THE INVENTION

A constant level oiler delivers lubricant to rotating equipment internal components and maintains the lubricant at a level within a case of the rotating equipment as specified by a manufacturer of the rotating equipment. Maintaining the lubricant at the level that is correct influences performance, reliability and life of the rotating equipment. Ensuring accuracy for the level of the lubricant relies on proper positioning of an adjuster in the oiler.

However, prior techniques for positioning the adjuster in the oiler often result in under-filling or over-filling the rotating equipment with the lubricant. Some approaches use time-consuming scaled measurements or inaccurate estimates to determine proper position of the adjuster in the oiler. Further, factors such as height of the adjuster in the oiler and crowding of other equipment around the oiler that has a fixed position can present problems when attempting to position the adjuster.

Therefore, a need exists for a tool that aides in adjusting an oiler coupled in fluid communication to rotating equipment.

BRIEF SUMMARY OF THE DISCLOSURE

In one embodiment, an apparatus for adjusting a constant level oiler includes a cylindrical insert with an oiler level adjuster engaging bottom and disposable in the oiler with the bottom of the insert supported by a level adjuster inside the oiler. A laser couples to the insert and extends from the insert in a first direction. In addition, a counterweight couples to the insert and extends from the insert in a second direction opposite the first direction to counterbalance the laser.

According to one embodiment, an apparatus for adjusting a constant level oiler includes an insert with an oiler level adjuster engaging bottom and disposable in an oiler with the bottom of the insert supported by a level adjuster inside the oiler. A laser couples to the insert and extends from the insert. This coupling of the laser to the insert permits adjustment of the laser in at least one direction relative to the insert.

For one embodiment, a method of adjusting a constant level oiler includes disposing a cylindrical insert of a level adjustment tool in the oiler with a bottom of the insert supported by a level adjuster inside the oiler. The tool balances on the level adjuster with a laser coupled to the insert extending from the insert in a first direction and a counterweight coupled to the insert extending from the insert in a second direction opposite the first direction. Projecting light from the laser onto a rotating equipment housing to identify position of the level adjuster relative to an oil level marker on the rotating equipment housing enables adjusting the level adjuster to a desired location based on the light projected onto the rotating equipment housing.

BRIEF DESCRIPTION OF THE DRAWINGS

A more complete understanding of the present invention and benefits thereof may be acquired by referring to the follow description taken in conjunction with the accompanying drawings.

DETAILED DESCRIPTION

Embodiments of the invention relate to a tool with a laser to assist with adjustment of a constant level oiler associated with rotating equipment. The tool projects light from the laser onto a housing of the rotating equipment to identify position of a level adjuster of the oiler relative to an oil level marker on the housing of the rotating equipment. The tool includes a portion that is inserted into part of the oiler during use of the tool and is coupled to the laser, which may be moveable from the portion inserted and may have extension from the portion inserted counterbalanced by a weight also coupled to the portion inserted.

Figure 1:
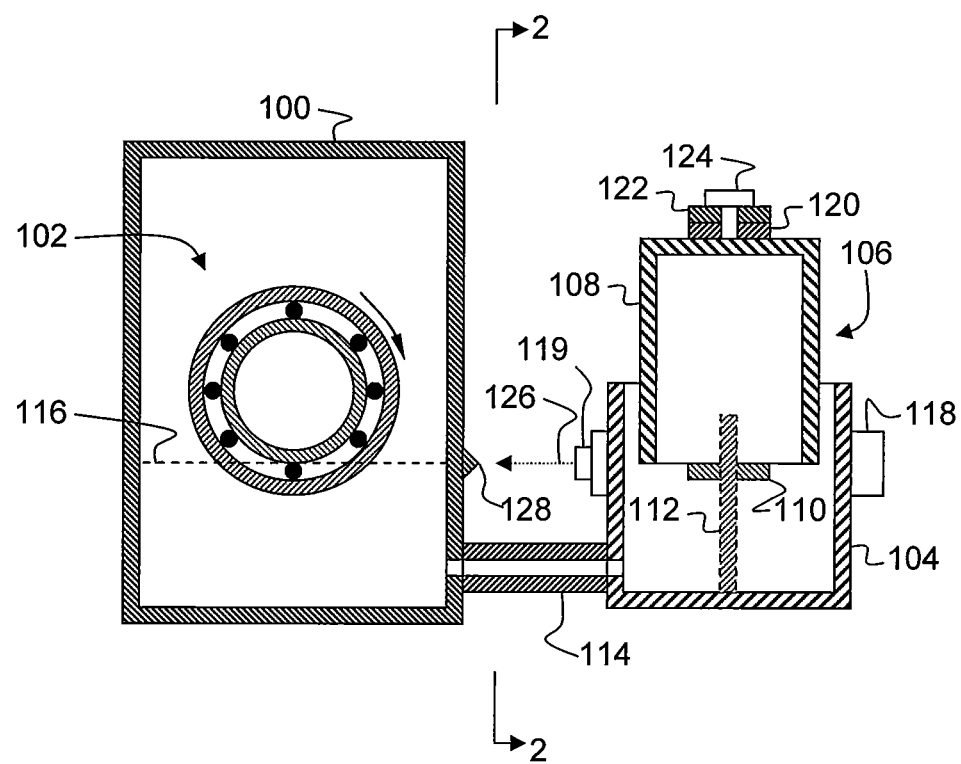
FIG. 1 is a schematic cross-section view of an oiler level adjustment tool in use with a reservoir of an oiler and associated rotating equipment, according to embodiments of the invention.

FIG. 1 illustrates a housing 100 for rotating equipment 102, an oiler reservoir 104 forming part of a constant level oiler and an oiler level adjustment tool 106 The tool 106 shown in operation includes an insert 108 supported on a level adjuster 110 inside the oiler reservoir 104. Position of the level adjuster 110 threaded onto a stem 112 extending upward in the oiler reservoir 104 controls lubricant supply through a connecting conduit 114 between the oiler reservoir 104 and the housing 100 in order to maintain a lubricant level 116 as desired inside the housing 100 for proper lubrication of the rotating equipment 102.

In some embodiments, the insert 108 matches a shape of the oiler reservoir 104. For example, the insert 108 may define a cylindrical shape and may be hollow, open ended or solid. The insert 108 may contact the lubricant in the oiler reservoir 104 and thus may be made of a material that does not interact with the lubricant. Examples of the material forming the insert 108 include polymers, such as an acetal polymer, or stainless steel. For some embodiments, molding may provide the insert 108 without requiring expensive machining. Further, making the insert 108 a replaceable or interchangeable component of the tool 106 rather than being integral in some embodiments facilitates adaptability to different shapes and sizes of the oiler reservoir 104 and selection of the insert 108 to avoid contamination of the lubricant from the insert 108 that may be unclean or made of incompatible material.

The tool 106 further includes a receptacle 118 to receive and hold a laser 119. The receptacle 118 couples to the insert 108 via a first elongated member 120 extending from the insert 108 in a first direction. The first elongated member 120 along with a counterweight arm 122 both secure to a top of the insert 108 with one or more horizontal adjustment fasteners 124, such as screws or bolts, and may be combined together, in some embodiments.

In operation, the laser 119 projects light 126 onto the housing 100 for the rotating equipment 102 to enable alignment of the level adjuster 110 with a mark 128 on the housing 100. Position of the laser 119 for some embodiments sets the light 126 being projected at a same level as a bottom of the insert 108 resting directly on top of the level adjuster 110. An operator can thus raise or lower the level adjuster 110 as necessary in order to align the light 126 with the mark 128 and thereby achieve proper adjusting of the constant level oiler.

Figure 2:
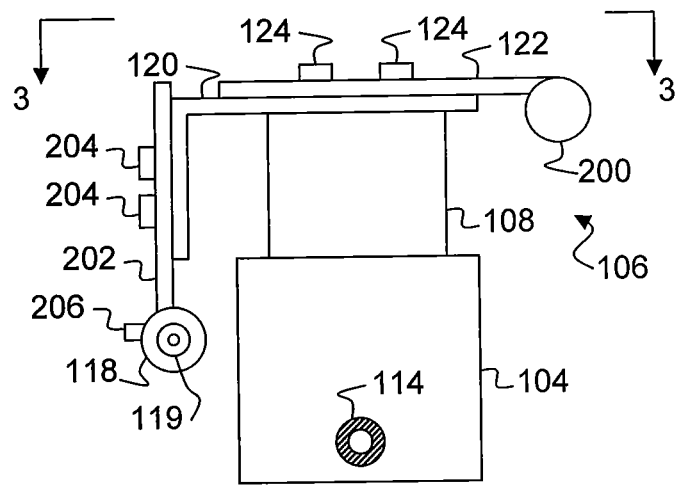
FIG. 2 is a side view of the tool and the reservoir of the oiler taken across line 2-2 of FIG. 1, according to embodiments of the invention.

FIG. 2 shows a front view of the tool 106 with the oiler reservoir 104. In some embodiments, the tool 106 further includes a counterweight 200 that counterbalances the laser 119 extending from the insert 108. The counterweight 200 attached to the arm 122 extending from the insert 108 in a second direction opposite the first direction that the laser 119 extends therefore balances the insert 108 upon the level adjuster 110 (visible in FIG. 1). This balancing due to the counterweight 200 limits wobbling of the tool 106 to help ensure precision of adjustments being made. Further, the balancing enables use of the tool 106 without relying on lateral support of the tool 106 from walls of the oiler reservoir 104 since such support from the oiler reservoir 104 can also impair precision of adjustments, limit range of possible adjustments and make installation and removal of the tool 106 from the oiler reservoir 104 difficult.

For some embodiments, a second elongated member 202 couples the receptacle 118 for the laser 119 with the first elongated member 120 that has an L-shape and is secured to the insert 108. One or more vertical adjustment fasteners 204, such as screws or bolts, hold the second elongated member 202 and the first elongated member 120 together overlapping along a portion of the first elongated member 120 that is bent, such as at a right angle, from where the first elongated member 120 secures to the top of the insert 108. A sliding, moveable or repositionable relationship between the first and second elongated members 120, 202 enables adjustment of the laser 119 along an axis of the insert 108 to move the laser 119 relative to the bottom of the insert 108. Such relationship may correspond to that described herein with respect to the first elongated member 120 and the insert 108, for example.

Some applications require adjustment of the laser 119 due to obstructions around the oiler reservoir 104 creating physical interference with the tool 106 or being in a light path of the laser 119. In some embodiments, the first or second elongated members 120, 202 include markings denoting deviation from a default location, such as corresponding to the bottom of the insert 108. Knowing deviation from the default location permits appropriate compensations to be made when using the tool 106. Furthermore, adjustability as described herein of the counterweight 200 relative to the insert 108 may maintain counterbalance as the laser 119 is adjusted.

A releasable connection permits repeated removal and attachment of the laser 119 to the insert 108. The releasable connection enables replacement of the laser 119 upon failure. As an exemplary configuration for the releasable connection, a set screw 206 holds the laser 119 in the receptacle 118 attached to the insert 108.

Figure 3:
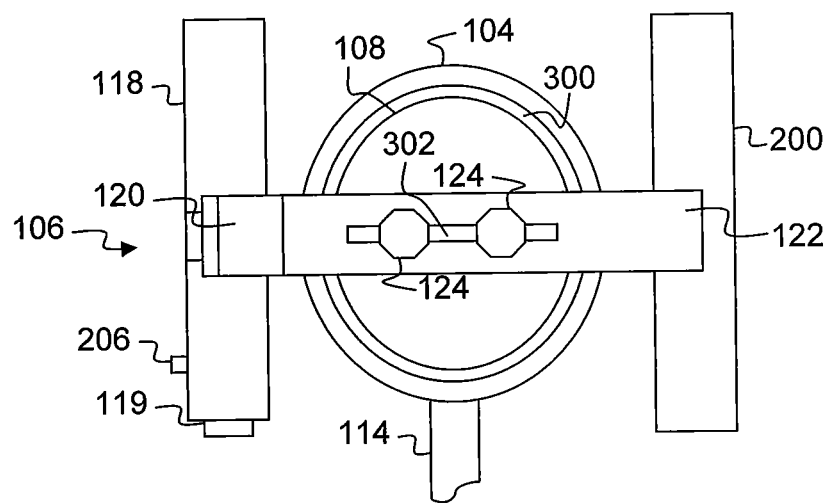
FIG. 3 is a top view of the tool and the reservoir of the oiler taken across line 3-3 of FIG. 2, according to embodiments of the invention.

FIG. 3 illustrates a top view of the tool 106 with the insert 108 inside the oiler reservoir 104. An annular clearance 300 between the insert 108 and the oiler reservoir 104 prevents sticking when disposing the insert 108 in the oiler reservoir 104 or removing the insert 108 from the oiler reservoir 104. Other than the clearance 300, the insert 108 obstructs an opening of the oiler reservoir 104 to at least limit debris from falling into the oiler reservoir 104.

A slot 302 extends through both the first elongated member 120 and the counterweight arm 122. The horizontal adjustment fasteners 124 extend through the slot 302 and hold the first elongate member 120 to the insert 108 due to a head of the horizontal adjustment fasteners 124 being larger than the slot 302. The horizontal adjustment fasteners 124 being moveable through the slot 203 as the laser 119 is adjusted from a first position to a second position relative to an axis of the insert 108 makes the laser 119 adjustable in a direction perpendicular to the axis of the insert 108. The counterweight 200 likewise adjusts relative to the insert 108 as result of the slot 302 extending through the counterweight arm 122 and being longer in length than spacing of the horizontal adjustment fasteners 124 to enable a range of motion before the counterweight arm 122 provides interference with the horizontal adjustment fasteners 124. Once position of the laser 119 and/or the counterweight 200 is adjusted, tightening of the horizontal adjustment fasteners 124 holds the laser 119 and/or the counterweight 200 in position.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
   disposing a cylindrical insert of a level adjustment tool in an oiler with a bottom of the insert supported by a level adjuster inside the oiler, wherein a laser coupled to the insert extends from the insert in a first direction and a counterweight coupled to the insert extends from the insert in a second direction opposite the first direction such that the tool is balanced on the level adjuster;
   projecting light from the laser onto a rotating equipment housing to identify position of the level adjuster relative to an oil level marker on the rotating equipment housing; and
   adjusting the level adjuster to a desired location based on the light projected onto the rotating equipment housing, wherein a first elongate member attached to the laser and the insert are securable together by a fastener that holds the first elongate member to the insert and extends through a slot in the first elongate member to enable adjustment of the laser.

2. The method according to claim 1, further comprising adjusting the laser relative to the insert to enable projecting of the light past an obstruction between the laser and the rotating equipment housing.

3. The method according to claim 1, further comprising adjusting the laser along an axis of the cylindrical insert a known distance relative to the bottom of the insert to enable projecting of the light past an obstruction between the laser and the rotating equipment housing.

4. The method according to claim 1, wherein the cylindrical insert obstructs an opening of the oiler except for an annular clearance between the insert and the oiler sufficient to prevent sticking when disposing the insert in the oiler.

5. An apparatus, comprising:
an insert with an oiler level adjuster engaging bottom and disposable in an oiler with the bottom of the insert supported by a level adjuster inside the oiler; and
a laser coupled to the insert and extended from the insert, wherein the laser is adjustable in at least one direction relative to the insert, wherein a first elongate member attached to the laser and the insert are securable together by a fastener that holds the first elongate member to the insert and extends through a slot in the first elongate member to enable adjustment of the laser.

6. The apparatus according to claim 5, wherein the laser is adjustable along an axis of the cylindrical insert.

7. The apparatus according to claim 5, wherein the laser is adjustable perpendicular to an axis of the cylindrical insert.

8. The apparatus according to claim 5, wherein the laser is adjustable along and perpendicular to an axis of the cylindrical insert.

9. The apparatus according to claim 5, wherein a counterweight is adjustable relative to the insert to maintain counterbalance as the laser is adjusted.

10. An apparatus, comprising:
a cylindrical insert with an oiler level adjuster engaging bottom and disposable in an oiler with the bottom of the insert supported by a level adjuster inside the oiler;
a laser coupled to the insert and extended from the insert in a first direction; and
a counterweight coupled to the insert and extended from the insert in a second direction opposite the first direction to counterbalance the laser, wherein a first elongate member attached to the laser and the insert are securable together by a fastener that holds the first elongate member to the insert and extends through a slot in the first elongate member to enable adjustment of the laser.

11. The apparatus according to claim 10, wherein the laser is adjustable in at least one direction relative to the insert.

12. The apparatus according to claim 10, wherein the laser is adjustable in at least one direction relative to the insert and the counterweight is adjustable relative to the insert to maintain counterbalance as the laser is adjusted.

13. The apparatus according to claim 10, wherein the laser is adjustable along an axis of the cylindrical insert to move the laser relative to the bottom of the insert.

14. The apparatus according to claim 10, wherein the laser is adjustable perpendicular to an axis of the cylindrical insert to move the laser relative to the axis of the insert.

15. The apparatus according to claim 10, wherein the laser is adjustable along and perpendicular to an axis of the cylindrical insert to move the laser relative to the insert.

16. The apparatus according to claim 10, wherein a releasable connection couples the laser to the insert and permits repeated removal and attachment of the laser to the insert.

17. The apparatus according to claim 10, wherein a set screw holds the laser in a receptacle attached to the insert.

18. The apparatus according to claim 10, further comprising rotating equipment having a housing, wherein the oiler is coupled to the rotating equipment to supply oil to the rotating equipment and maintain constant oil level inside the housing.

19. The apparatus according to claim 10, wherein a first elongate member attached to the laser and a second elongate member attached to the insert provide multiple overlapping positions at which the elongate members are securable together to enable adjustment of the laser relative to the bottom of the insert.

* * * * *